United States Patent [19]

Schubring

[11] 4,398,317

[45] Aug. 16, 1983

[54] CHECK STRAP

[75] Inventor: Gary L. Schubring, New Baltimore, Mich.

[73] Assignee: USM Corporation, Farmington, Conn.

[21] Appl. No.: 198,455

[22] Filed: Oct. 20, 1980

Related U.S. Application Data

[63] Continuation of Ser. No. 12,001, Feb. 14, 1979, abandoned.

[51] Int. Cl.[3] .......................... E05F 5/14; E05F 7/06; B60R 7/06

[52] U.S. Cl. ........................................ 16/82; 24/302; 296/37.12; 411/41

[58] Field of Search ................ 24/298, 300, 301, 302, 24/DIG. 16; 411/41; 16/82 R, 86 R, DIG. 23; 296/37.12

[56] References Cited

U.S. PATENT DOCUMENTS

| | | | |
|---|---|---|---|
| 1,837,517 | 12/1931 | Ball | 16/82 |
| 2,956,468 | 10/1960 | Macy | 411/41 |
| 3,417,438 | 12/1968 | Schuplin | 411/41 |
| 3,508,303 | 4/1970 | Miyasaka | 24/298 |
| 3,588,792 | 6/1971 | Kindell et al. | 24/298 X |

FOREIGN PATENT DOCUMENTS

| | | | |
|---|---|---|---|
| 251955 | 6/1964 | Australia . | |
| 1450932 | 3/1969 | Fed. Rep. of Germany . | |
| 1004846 | 9/1965 | United Kingdom . | |
| 1122512 | 8/1968 | United Kingdom | 411/41 |

*Primary Examiner*—Wm. Carter Reynolds
*Attorney, Agent, or Firm*—Aubrey C. Brine

[57] ABSTRACT

A one piece molded strap assembly is provided to be employed in limiting travel between two movable parts. A pair of expandable bosses are connected by a resilient link and a drive pin is molded to each of the bosses which when separated from, and inserted into, a respective boss is effective to expand the boss and return it in an opening formed in a respective part.

2 Claims, 4 Drawing Figures

CHECK STRAP

This is a continuation of application Ser. No. 12,001 filed Feb. 14, 1979, now abandoned.

BACKGROUND OF THE INVENTION

The present invention relates to a checking device, and more particularly to a one piece molded strap assembly which may be employed in limiting travel between two movable parts.

In the design and assembly procedures of various mechanical components, there is often the need to provide a checking device for maintaining two movable parts at a predetermined distance during use of the device. This is particularly true in the case of a hinged door which is to be maintained in a particular orientation when fully opened and in which a greater degree of movement of the door would be undesirable or untolerated. Such a device as the tailgate of a station wagon or the glove box door as found in the automotive field are typical examples wherein it is desirable to maintain the door in the horizontal position, when fully opened.

Various arrangements have been employed in the past to meet the requirements set forth above, and have met with acceptance. However, prior methods and structure have generally required the use of screws, rivets and other fastening means employed to retain the checking device on the structure. Generally, the assembly techniques required to install these devices, have required a plurality of parts which are expensive to maintain in inventory and a considerable amount of labor to install the various parts provided.

In the case of an automobile glove box door which is subjected to a number of cycles of opening during the life of the automobile, repairs or service to the structure, requiring removal of the checking device, are time consuming and usually result in damage to the related components. In addition, in the instance where a single strap is employed to check the glove box door relative to the assembly, the minimum of separate parts which are necessary to retain an inventory for replacement or service would be three; a single cable and two threaded fasteners, the threaded fasteners often needing to be replaced with larger fasteners due to the damage to the structure in removing the fasteners therefrom. Thus, a plurality of fasteners and cables is necessary to provide this type of checking arrangement, even though attempts are made to keep the particular parts to a minimum.

It is therefore an object of the present invention to provide a check strap for limiting travel between two movable parts which is inexpensive, simple to manufacture, and easy to install and remove without damage to related parts.

A further object of the invention is to provide an article of manufacture which comprises a molded check strap assembly having the drive pins integrally conected thereto in the molding operation, resulting in a one piece article to be maintained in inventory for initial installation, replacement, or service requirements.

SUMMARY OF THE INVENTION

The above objects, and other objects which will become apparent as the description proceeds, are accomplished by providing a strap in its simplest form comprising a pair of bosses connected by a resilient link, wherein each of said bosses has a cylindrical bore formed therethrough to provide a relatively thin wall. The cylindrical bore of each boss has a tapered portion extending toward one end of the boss to provide a minimum bore dimension near the one end and a cylindrical drive pin comprising a cylindrical shank is inserted into the bore of the boss with the boss placed in an opening in the structure. The opening in the structure is such that the boss expands with the drive pin inserted therein due to the minimum bore dimension. A flange is provided at the end of the boss into which the drive pin is inserted and the drive pin is provided with a head having a surface mating with the flange when the drive pin is fully inserted into the bore of the boss. Both the surface of the drive pin head and the flange are provided with a chamfer which when juxtaposed one with the other forms a groove for insertion of a tool to pry the pin from the boss for easy disassembly.

The strap also may include an elongated member extending from the strap adjacent a boss, substantially parallel thereto, which is insertable into the structure when the boss is inserted, to prevent the boss from rotating and therefore maintain the strap in alignment when the strap is assembled to the structure.

In the preferred form the strap and drive pins are molded as a unitary structure, each of the drive pins being integrally connected to a respective boss by a frangible portion of said strap.

BRIEF DESCRIPTION OF THE DRAWING

Reference is made to the accompanying drawing in which there is shown an illustrative embodiment of the invention from which its novel features and advantages will be apparent, wherein.

DESCRIPTION OF THE PREFERRED EMBODIMENT

Figure 1:
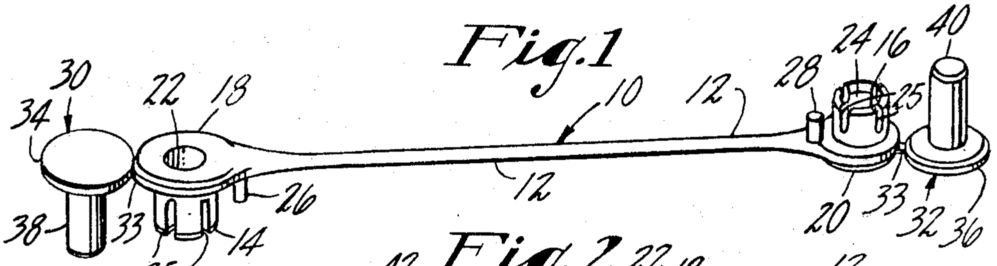
FIG. 1 is a perspective view showing a strap assembly constructed in accordance with the teachings of the invention.
Figure 2:
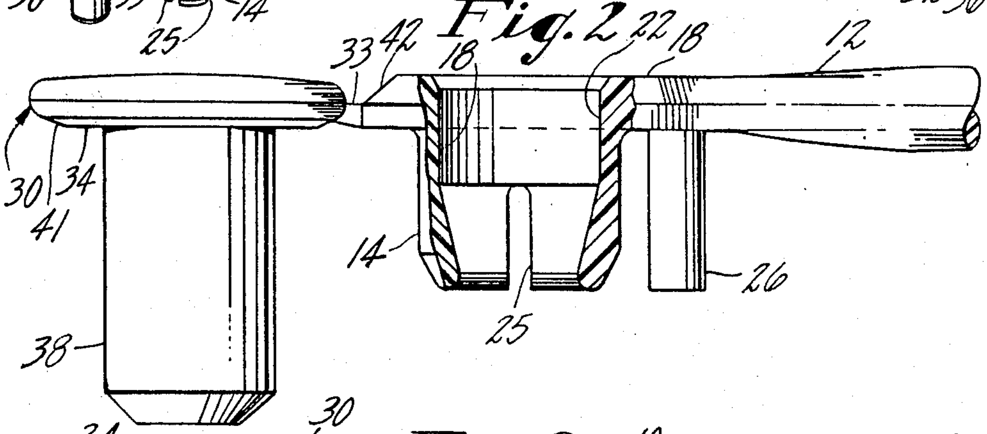
FIG. 2 is an elevational view partially in section, showing a portion of the strap of FIG. 1 taken on an enlarged scale for clarity.

Referring to the drawings and in particular to FIGS. 1 and 2, there is shown a one piece molded strap assembly 10 comprising a resilient link 12 of circular configuration having a pair of oppositely facing bosses 14 and 16 disposed at opposite ends of the link. Each of said bosses 14 and 16 has an outwardly projecting circular flange 18 and 20 respectively disposed at one end of a respective boss, to which the link 12 is connected. The link 12 being of circular configuration and resilient material is therefore, flexible in all directions about its centerline.

Each of the bosses 14 and 16 is further provided with a circular bore 22 and 24 respectively, extending through the respective boss. The outer diameter of the boss 14 and 16 and the diameter of the bores 22 and 24 are of a magnitude to produce a relatively thin wall in each of the bosses. At the end of each of the bosses 14 and 16 opposite the respective flange 18 or 20 the bore 22 or 24 is tapered inwardly from about halfway through the bore length to the open end thereof. A plurality of slots 25 extend from the tapered end of the bore 22, 24 to approximately the point along the bore length of which the taper begins.

Adjacent each of the bosses 14 and 16 and extending from the point at which the respective flange 18 or 20 is connected to the link 12, there is disposed an elongated member in the form of a cylindrical pin 26 or 28 of substantially smaller diameter than the bosses.

At the opposite side of the flanges 18 and 20 there is molded a drive pin 30 and 32 respectively, each of which is connected to the flange by a frangible tab 33. Each of the drive pins 30 and 32 comprises a circular head 34 and 36 respectively, and a cylindrical shank 38 and 40 respectively.

As will be noted particularly in FIG. 2, the drive pin 30 is provided with a chamfer 41 on the underside thereof and the flange 18 is provided with a similar chamfer 42 at the edge thereof for purposes which will be explained in detail as the description proceeds. As with each of the features described above, the boss 18 and the boss 16 are substantially identical as to construction as is the drive pin 30 and the drive pin 32 and therefore it may be concluded that the drive pin 32 and the flange 20 of the boss 16 also are provided with similar chamfers.

In the embodiment shown, the strap assembly 10 is injection molded from a nylon material, however, any suitable resilient material which is capable of being injection molded may be employed for the assembly. As typical dimensions for the construction shown in the preferred embodiment, the bosses 14 and 16 have an outer diameter of 0.310 inches and a major internal diameter of 0.268 inches which tapers at a 15° angle from a point 0.160 inches from the end of the boss, to the minimum diameter. Each of the drive pins 30 and 32 have a 0.268 diameter shank.

Figure 3:
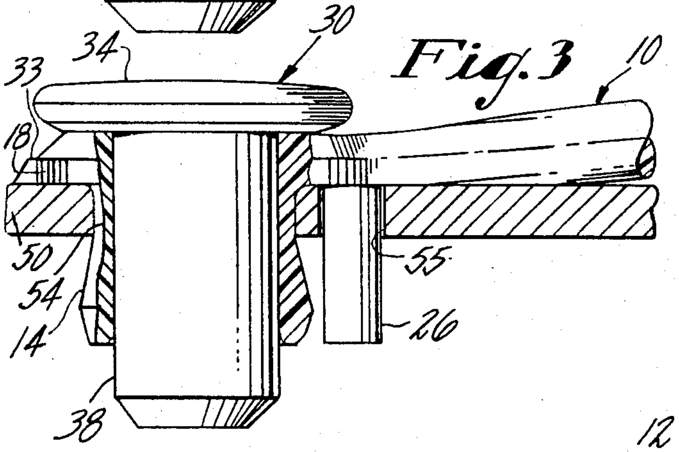
FIG. 3 is an elevational view partially in section showing the structure of FIG. 2 in the assembled condition.
Figure 4:
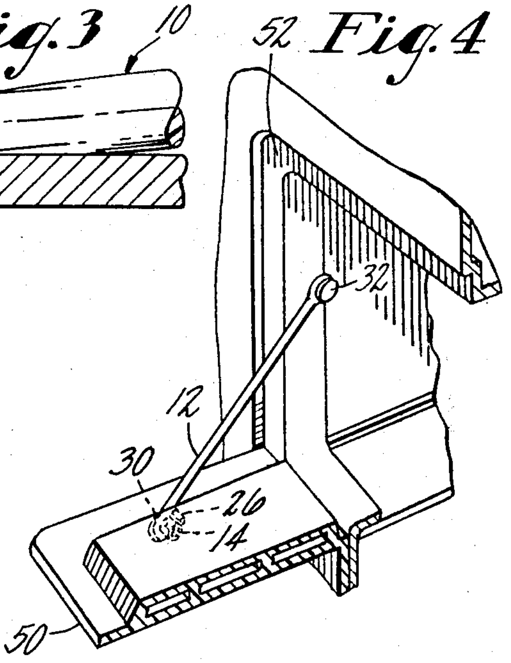
FIG. 4 is a perspective view showing the strap of FIG. 1 employed in a typical environment.

Referring now to FIGS. 3 and 4, the strap assembly 10 will be described as employed in retaining a hinged glove box door 50 in fixed relation with the glove box structure 52. It should here be noted that the mounting of the strap assembly 10 to the door 50 and structure 52 will be described only with reference to that end of the assembly attached to the door, however it should be evident that the mounting of the opposite end of the strap assembly to the structure 52 would be achieved in like manner.

Referring particularly to FIG. 3, in preparing the glove box door 50 for installation of the strap assembly 10, a pair of holes 54 and 55 are drilled into the wall structure of the door on centerlines corresponding to the boss 14 and the cylindrical pin 26, but each of slightly larger diameter than the outer diameter of the boss and pin to be received therein.

The drive pin 30 may now be separated from the strap assembly 10 for insertion into the inner bore 22 of the boss 14. By employing known techniques of injection molding, it is possible to fabricate the frangible tab 33 to a dimension such that the drive pin 30 is separated from the assembly 10 by merely twisting the two, and pulling them apart, simultaneously.

The boss 14 and the pin 26 are now inserted into the opening 54 and the pin 30 forced into the boss to produce the structure in its assembled form as shown in FIG. 3. It will be noted that in forcing the shank 38 into the bore 22 the outer wall of the boss 14 expands to inhibit removal of the boss from the structure of the door 50. This is accomplished by virtue of the tapered end of the bore 22 in conjunction with the plurality of slots 25, allowing the end of the boss to expand beyond the limits of the hole 54.

By aligning the centerlines of the holes 54,55 in the door 50, or glove box structure 52, when the door is in the open position, the link 12 is prevented from being moved to a position between the door and the glove box structure when the door is closed. The pin 26 and 28 prevents rotation of the boss 14 or 16 and the result is that the link moves downwardly into the door opening, when the door is closed.

It will further be observed in FIG. 3 that with the drive pin 30 fully inserted into the boss 14, the chamfers 41 and 42 form a groove around the circumference of the head 34 of the drive pin. This facilitates the removal of the drive pin 30 by inserting a screwdriver or other sharp instrument between the head 34 and the flange 18, without harmful effect to either of the components of the assembly. The strap assembly 10 may therefore, be employed in structures where removal of the component from time to time is necessary, and may be reused a number of times without destroying the integrity of the structure or without reworking either the strap assembly 10 or the components which are linked thereby.

I claim:

1. A strap for limiting travel between a glove box door and the glove box structure of a vehicle, said strap comprising a pair of cylindrical bosses each having a circular flange at one end thereof, each said flange connected to a respective opposite end of a resilient link, said link being flexible in all directions about its center line, each of said bosses having a circular bore formed therethrough to provide a relatively thin wall, each said circular bore having an inwardly tapered portion extending toward the end of said bore opposite said end at which said flange is disposed to provide a minimum dimension of said bore near said opposite bore end, a pair of cylindrical drive pins each comprising a cylindrical shank for insertion into a said bore and a circular head at one end thereof each connected to a respective circular flange of a said boss by a frangible portion of said strap, a plurality of slots formed in said thin wall and extending from said opposite bore end over substantially the length of said tapered portion of each said boss and a pair of elongated members one extending from said strap adjacent each of said bosses and substantially parallel thereto, whereby with one boss and its adjacent elongated member received in a respective pair of spaced openings in said door and the other said boss and its adjacent elongated member received in a respective pair of spaced openings in said glove box structure, said cylindrical drive pins separated from said strap at said frangible portions are assembled with each said pin shank inserted into a respective boss bore causing said boss bore to expand and retain said boss in its respective opening with said elongated member inhibiting rotation of said boss.

2. A strap as set forth in claim 1 wherein each of said circular heads has a surface adjacent said shank for contacting a surface of said flange of said boss with said pin inserted in said boss bore, and said flange surface and said head surface each has a chamber formed at the edge thereof in opposed relation to form a groove between said contacting surfaces to facilitate separation of said drive pin from said boss by prying action.

* * * * *